United States Patent
Mueller et al.

(10) Patent No.: US 9,708,984 B2
(45) Date of Patent: Jul. 18, 2017

(54) REGULATING METHOD FOR A TURBOCHARGER OF AN INTERNAL COMBUSTION ENGINE, AND TURBOCHARGER

(75) Inventors: Volker Mueller, Ingelheim (DE); Ralf Christmann, Kaiserslautern (DE); Gerd Spinner, Alzey (DE)

(73) Assignee: BorgWarner Inc., Auburn Hills, MI (US)

( * ) Notice: Subject to any disclaimer, the term of this patent is extended or adjusted under 35 U.S.C. 154(b) by 376 days.

(21) Appl. No.: 12/519,547

(22) PCT Filed: Oct. 24, 2007

(86) PCT No.: PCT/EP2007/009235
§ 371 (c)(1),
(2), (4) Date: Jun. 17, 2009

(87) PCT Pub. No.: WO2008/083771
PCT Pub. Date: Jul. 17, 2008

(65) Prior Publication Data
US 2010/0058757 A1   Mar. 11, 2010

(30) Foreign Application Priority Data
Dec. 21, 2006  (DE) .................. 10 2006 060 813

(51) Int. Cl.
F02D 23/00   (2006.01)
F02D 23/02   (2006.01)
(Continued)

(52) U.S. Cl.
CPC .............. *F02D 23/02* (2013.01); *F02B 37/24* (2013.01); *F02C 9/22* (2013.01); *F02D 41/0007* (2013.01);
(Continued)

(58) Field of Classification Search
CPC ....... F02B 37/24; F02B 37/22; F02D 41/0007
(Continued)

(56) References Cited

U.S. PATENT DOCUMENTS 6,314,735 B1 * 11/2001 Kolmanovsky et al. ....... 60/602
6,425,247 B1 *  7/2002 Schmid ........................... 60/602
(Continued)

FOREIGN PATENT DOCUMENTS

DE   102004042272 A1 *  3/2006  .............. F02B 37/12
EP       1031713 A1    8/2000
(Continued)

*Primary Examiner* — Phutthiwat Wongwian
*Assistant Examiner* — Ngoc T Nguyen
(74) *Attorney, Agent, or Firm* — Eric L. Doyle; Stephan A. Pendorf; Patent Central LLC (57) ABSTRACT

The invention relates to a regulating method for a turbocharger (1) with a turbine (4) which has a variable turbine geometry (VTG) provided with adjustable guide blades (5), having the following method steps: a) closing the guide blades (5) of the variable turbine geometry (VTG), as a function of the present operating point of the internal combustion engine which is turbocharged by means of the turbocharged (1), to the maximum possible closing position of the guide blades (5) for said operating point, and b) regulating the charge pressure (P2) by adjusting the position of the guide blades (5) in a closed regulating loop.

14 Claims, 5 Drawing Sheets

(51) Int. Cl.
    *F02B 37/24*     (2006.01)
    *F02C 9/22*      (2006.01)
    *F02D 41/00*     (2006.01)

(52) U.S. Cl.
    CPC ......... *F05D 2220/40* (2013.01); *Y02T 10/144* (2013.01)

(58) Field of Classification Search
    USPC .................................. 60/602; 701/102, 103
    See application file for complete search history.

(56) References Cited

U.S. PATENT DOCUMENTS

| | | | |
|---|---|---|---|
| 6,435,167 B1* | 8/2002 | Finger et al. | 123/568.12 |
| 6,510,691 B1* | 1/2003 | Schmid | 60/602 |
| 6,662,562 B2* | 12/2003 | Engel et al. | 60/602 |
| 6,928,817 B2* | 8/2005 | Ahmad | 60/602 |
| 7,076,953 B2* | 7/2006 | Kreso | 60/605.2 |
| 7,905,091 B2* | 3/2011 | Kassner | 60/602 |
| 2003/0188531 A1* | 10/2003 | Wright et al. | 60/602 |
| 2005/0022524 A1* | 2/2005 | Ando et al. | 60/602 |
| 2006/0288701 A1* | 12/2006 | Ramamurthy et al. | 60/602 |
| 2007/0204617 A1* | 9/2007 | Sterner et al. | 60/602 |
| 2008/0071443 A1* | 3/2008 | Cox | 701/35 |
| 2008/0148727 A1* | 6/2008 | de Ojeda | 60/602 |
| 2008/0196404 A1 | 8/2008 | Kassner | |
| 2010/0168976 A1* | 7/2010 | Andrasko | F02D 9/06 701/70 |

FOREIGN PATENT DOCUMENTS

| | | | |
|---|---|---|---|
| EP | 1471234 A2 | 10/2004 | |
| FR | 2882576 A1 | 9/2006 | |
| WO | 2004027235 A1 | 4/2004 | |

* cited by examiner

Phase 1

Move VTG guide blades into the maximum possible closed position for present operating point 100-500 ms

Optional Phase 2

Move VTG guide blades into a position which is suitable for the optimum increase in charge, determined at least predominant on the basis of rotational speed and torque values, whereby the charge pressure is controlled by open loop control and the vane position is regulated by a closed loop regulation.

Phase 3

When "actual charge pressure" virtually reaches "charge pressure demand", establish a constant and stable operating state, with a closed regulating loop for standard charge-pressure regulation and with a closed regulating loop for VTG guide blade position regulation

Fig. 7

REGULATING METHOD FOR A TURBOCHARGER OF AN INTERNAL COMBUSTION ENGINE, AND TURBOCHARGER

The invention relates to a regulating method for an exhaust-gas turbocharger of an internal combustion engine, as per the preamble of claim 1, and to a turbocharger as per the preamble of claim 6.

In known turbochargers with an adjustable turbine geometry (VTG), a drop in charge pressure can occur if, by means of a conventional PID regulator and a pneumatic control capsule, the VTG is closed to too great an extent. Moreover, in the control capsule, there is a hysteresis effect in the stroke values of the actuating rod during a pressure increase and during a pressure drop, which has an adverse effect on the overall regulating characteristic.

It is therefore an object of the present invention to create a regulating method of the type specified in the preamble of claim 1, and a turbocharger as per the preamble of claim 6, by means of which it is possible to at least reduce the stated hysteresis effect of the control capsule and to obtain optimized position regulation of the guide blades of the VTG.

Said object is achieved by means of the features of claim 1 and claim 7 respectively.

According to the invention it is correspondingly possible to minimize the hysteresis effect of the control capsule and to obtain a faster response time and also more precise position regulation of the guide blades of the VTG.

It is also possible to determine the optimized position of the guide blades of the VTG for the build-up of charge pressure, and to at least reduce other adverse effects, such as those of exhaust-gas recirculation.

Subclaims 2 to 5 and 8 contain advantageous refinements of the regulating method according to the invention and of the turbocharger according to the invention respectively.

In one particularly preferred embodiment of the regulating method according to the invention, a three-phase strategy or approach is selected.

In the first phase, the guide blades of the variable turbine geometry are moved, as a function of the present operating point, into the maximum possible closed position for said operating point, which makes it possible to avoid or at least reduce the hysteresis of the control capsule.

In the optional phase 2 of the regulating method according to the invention, the variable turbine geometry or the guide blades thereof are moved by pilot control into an optimum position which is generated primarily from the rotational speed and the torque of the supercharger engine. A subordinate position regulating loop is preferably active here.

In the third phase of the regulating method according to the invention, the charge pressure is regulated, with a charge pressure regulating loop and the subordinate position regulating loop preferably being active.

Overall, by means of the regulating method according to the invention, an optimized build-up of charge pressure is obtained, wherein it is possible for this purpose for the turbocharger according to the invention to be provided with a pneumatic control capsule with position sensors or alternatively with an electric actuating element.

Figure 1:
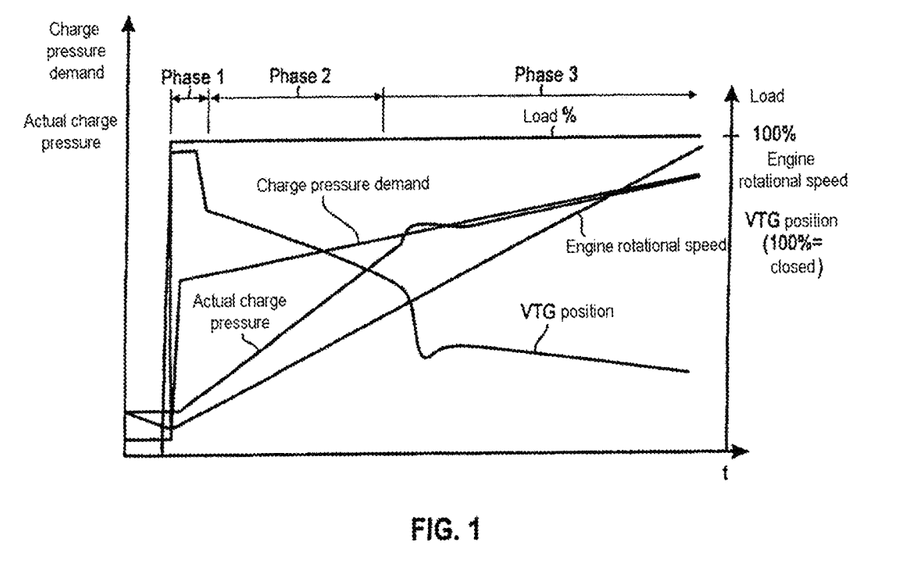

Further details, advantages and features of the present invention can be gathered from the following description of exemplary embodiments on the basis of the drawing, in which:

FIG. 1 shows a diagram in which the charge pressure demand, the actual charge pressure, the engine load, the engine rotational speed and the position of the guide blades of the VTG are plotted against time, in order to explain a particularly preferred embodiment of the regulating method according to the invention.

The regulating strategy depicted in FIG. 1 comprises three phases, wherein phase 2 is optional, that is to say may also be omitted in certain applications.

Figure 2:
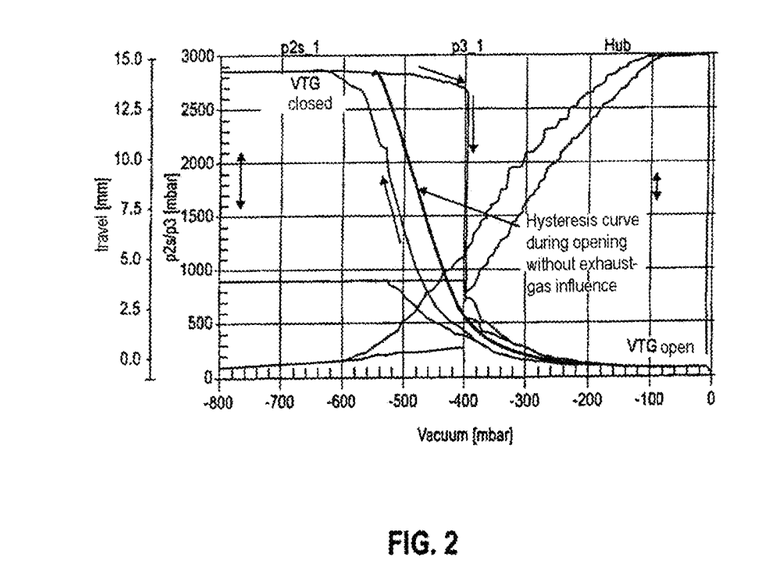
FIG. 2 shows a further diagram for explaining advantageous effects of the regulating method according to the invention.

In phase 1, it is sought to increase the exhaust-gas back pressure P3, which is indicated in FIG. 2, in order to improve the response characteristic. For this purpose, the guide blades of the VTG are briefly regulated to the maximum closed state for the respective present operating point, with phase 1 being active only for approximately 100 to 200 ms, a maximum of 500 ms. As can be seen from the diagram of FIG. 1, control of the charge pressure is carried out in said phase 1.

In the optional phase 2, it is sought to always utilize the best potential for the increase in charge pressure, wherein it is sought to preferably prevent any delay in the response behavior which may occur in conventional regulators with a closed regulating loop.

In said phase 2, the guide blades of the VTG are moved by regulation into a position which is suitable for the optimum increase in charge pressure, which is specific for each operating point. Here, control of the charge pressure is carried out and position regulation of the guide blades is carried out with a closed regulating loop.

Phase 2 is activated until the charge pressure has virtually reached its preset value.

In phase 3, a constant and stable operating state is sought, with it being possible for standard charge-pressure regulation to be carried out with a closed regulating loop and for position regulation to be carried out with a closed regulating loop.

The charge pressure may preferably be regulated by means of a standard PID regulator.

FIG. 2 illustrates a summary of the above-explained three-phase regulating strategy in the form of a travel-pressure diagram.

As explained above, in phase 1, the VTG is completely closed for a short time in order to obtain an increase in the exhaust-gas back pressure P3 as quickly as possible. Here, control of the VTG charge pressure is carried out with an open regulating loop.

In phase 2, control of the VTG charge pressure is carried out with an open regulating loop and position regulation is carried out with a closed regulating loop. Here, the VTG is set to the position which permits the fastest increase in charge pressure. Optimum VTG positions may be stored.

Finally, in phase 3, charge pressure regulation is carried out with a closed regulating loop and position regulation is carried out with a closed regulating loop, wherein the regulation with a closed regulating loop is preferably active only when the nominal value of the charge pressure has virtually been reached.

Figure 3:
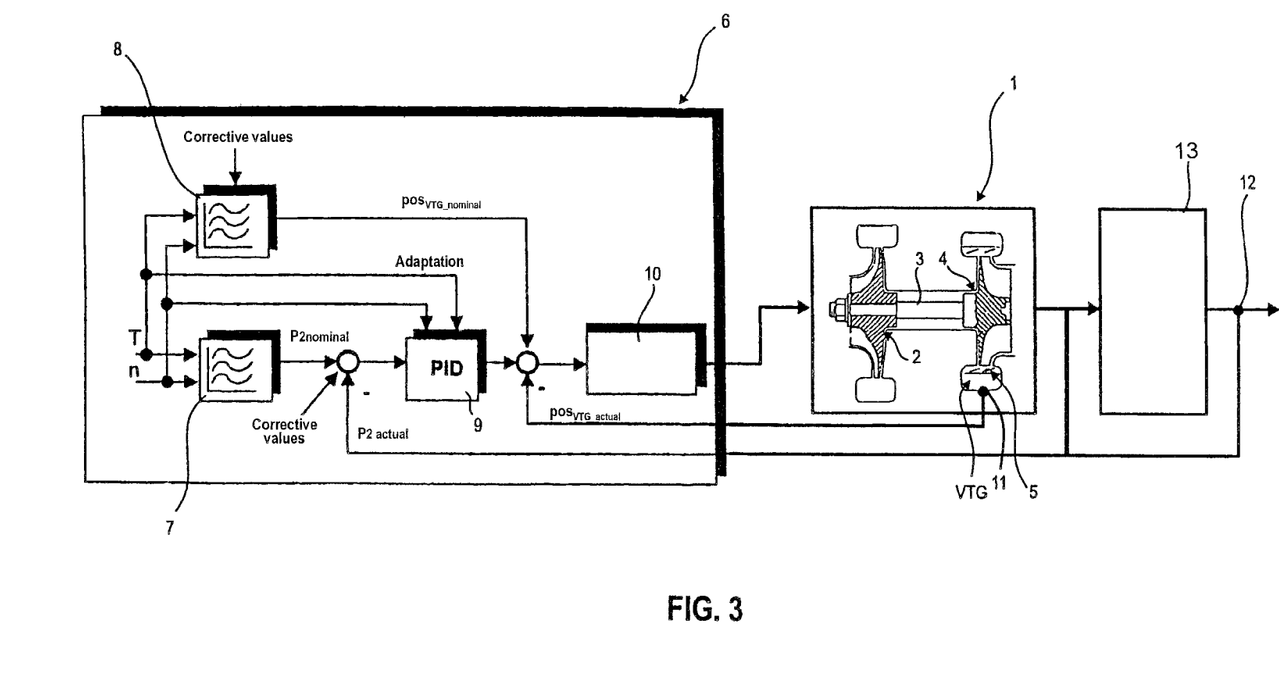
FIG. 3 shows a schematically highly simplified block diagram of a turbocharger according to the invention.
Figure 4:
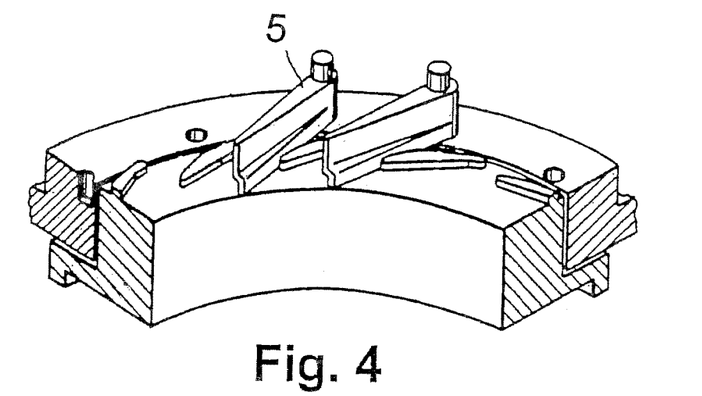
FIG. 4 shows a VTG with guide blades in an open position.
Figure 5:
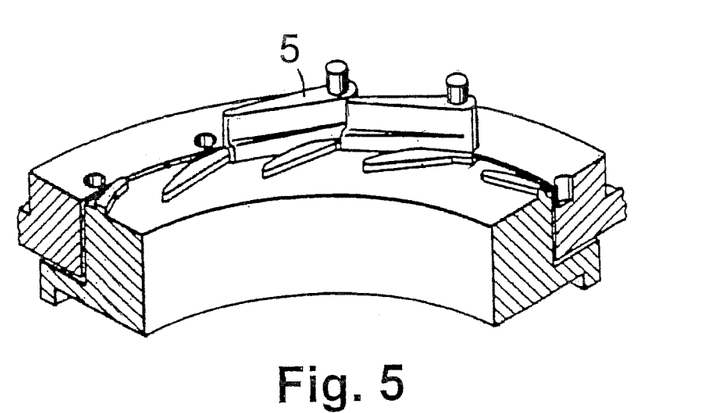
FIG. 5 shows a VTG with guide blades in a closed position.
Figure 6:
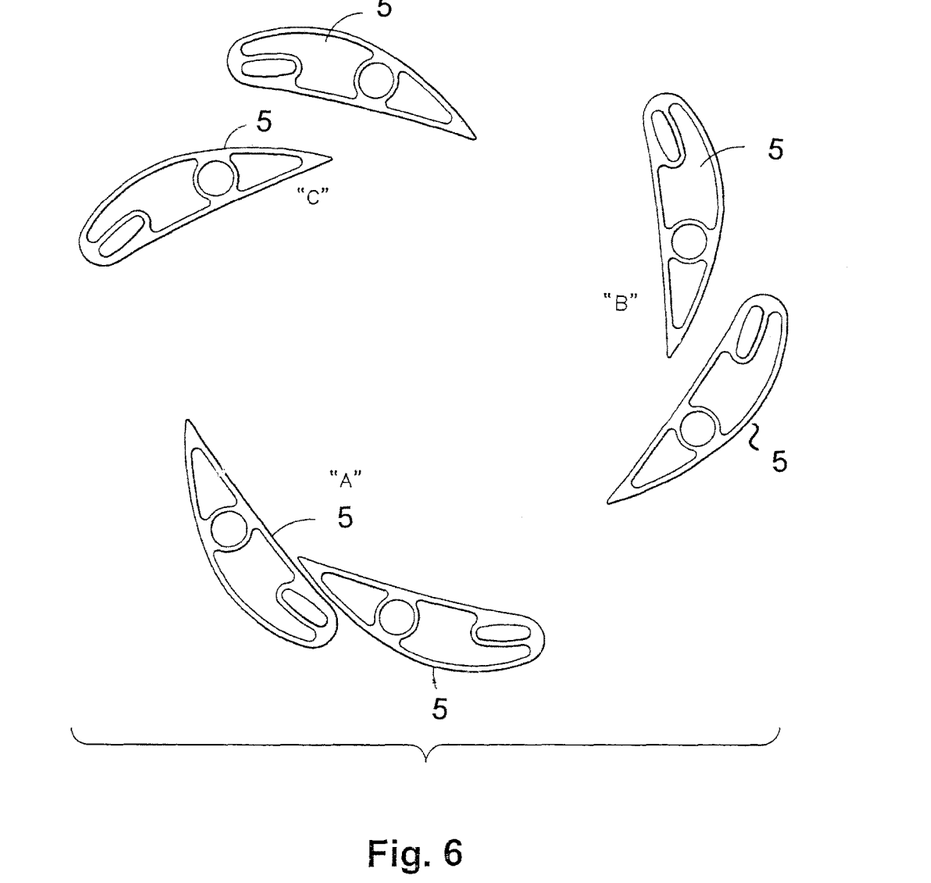
FIG. 6 shows VTG vanes in the closed position "A" (Phase 1), a partially open position "B" (Phase 2) and an open position "C" (Phase 3)
Figure 7:
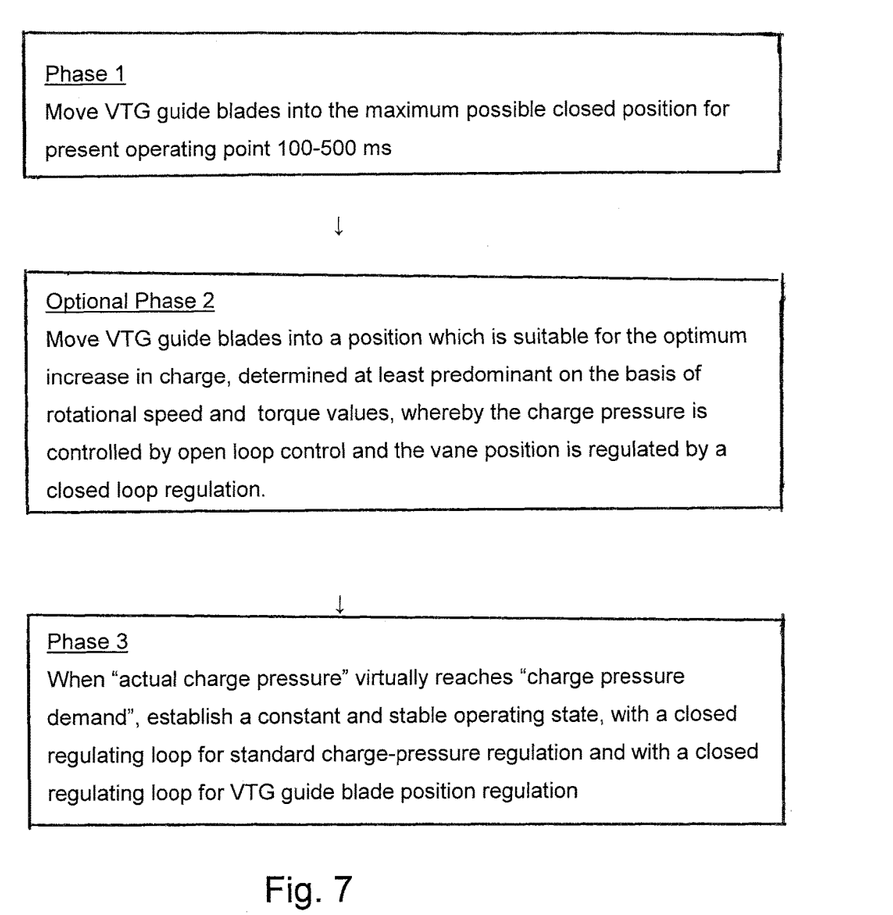
FIG. 7 shows the method steps of the present invention.

FIG. 3 illustrates a schematically highly simplified block diagram of a turbocharger 1 according to the invention which has a compressor wheel 2 which is connected by means of a rotor shaft to a turbine 4 which has a VTG with blades 5. For the explanation of the operating principles of the regulating strategy according to the invention, and of the turbocharger according to the invention, said components are illustrated in schematically simplified form in block 1 of FIG. 3, since this illustration is sufficient for explaining the principles of the present invention. Depending on the application, the turbocharger 1 according to the invention of course also has all the other components of conventional turbochargers, the explanation of which is however not required for the purpose of describing the present invention.

The turbocharger 1 is provided for supercharging an internal combustion engine, for example a spark-ignition or diesel engine 13, which is likewise indicated by a further block.

According to the invention, the turbocharger 1 has a regulating device 6 which comprises the following components:

Firstly, a first determining device 7 is provided, by means of which a nominal value $P2_{NOMINAL}$ for the charge pressure P2 can be determined. For this purpose, rotational speed and torque data of the engine 13 are input into the determining device 7, which data are indicated by the letters n (rotational speed) and T (torque).

Said data are likewise input into a second determining device 8, by means of which nominal values of the position of the VTG (Position $VTG_{NOMINAL}$) are determined. The second determining device 8 includes a processor.

A charge-pressure regulator 9, which generates an output signal for the position regulation on the basis of the present difference between $p2_{nominal}$ and $p2_{actual}$, is arranged in series with the first determining device 7, which is provided in parallel with the second determining device 8.

The rotational speed and torque values and the nominal values $P2_{NOMINAL}$ of the charge pressure P2, and also actual values of the charge pressure $P2_{ACTUAL}$ which are if appropriate detected by a sensor 12, are likewise input into the charge-pressure regulator 9.

A guide blade position regulator 10 is likewise provided in series with the charge-pressure regulator 9, wherein in addition to the values supplied by the charge-pressure regulator 9, nominal values of the position of the guide blades 5 of the VTG, which are indicated in FIG. 3 by the arrow $POS_{VTG}$, are also supplied to said guide blade position regulator 10 when activated. Said values may be detected by a sensor 11 which can determine the position of the guide blades 5.

To optimize the regulating method according to the invention by means of the regulating device 6 illustrated in FIG. 3, it is also possible to take into consideration corrective values which are indicated in FIG. 3 by the respective arrows.

A guide blade position regulator 10 is likewise provided in series with the charge-pressure regulator 9, wherein in addition to the values supplied by the charge-pressure regulator 9, nominal values of the position of the guide blades 5 of the VTG, which are indicated in FIG. 3 by the arrow $POS_{VTG}$, are also supplied to said guide blade position regulator 10 when activated. The guide blade position regulator 10 can regulate the position of the guide blades (5) of the variable turbine geometry (VTG) on the basis of the nominal values ($POS_{VTG\_NOMINAL}$) of the guide blade position supplied by the second determining device 8 and the output signals supplied by the regulator 9. In some instances, the guide blade position regulator 10 can also regulate the position of the guide blades (5) of the variable turbine geometry (VTG) on the basis of fed-back actual values ($POS_{VTG\_ACTUAL}$) of the actual guide blade position. Said values may be detected by a sensor 11 which can determine the position of the guide blades 5. The sensor 11 can measure the actual position of the guide blade ($POS_{VTG\_ACTUAL}$).

To complement the above written disclosure of the invention, reference is hereby explicitly made to the diagrammatic illustration of the invention in FIGS. 1 to 3.

LIST OF REFERENCE SYMBOLS

1 Turbocharger
2 Compressor
3 Rotor shaft
4 Turbine
5 Guide blades of the variable turbine geometry VTG
6 Regulating device
7 First determining device
8 Second determining device
9 Charge pressure regulator
10 Guide blade position regulator
11, 12 Sensors
13 Engine

The invention claimed is:

1. A regulating method for a turbocharger (1) having a turbine (4) receiving exhaust flow from an engine, the turbine (4) having a variable turbine geometry (VTG) which is provided with adjustable guide blades (5), the turbocharger (1) having a compressor driven by the turbine (4) for providing air at a charge pressure to an engine, the method comprising:

a) sensing an increase in engine torque,
b) closing the guide blades (5) of the variable turbine geometry (VTG), as a function of a present operating point of the internal combustion engine which is supercharged by means of the turbocharger (1), to the maximum closed position of the guide blades (5) for said operating point, for 100-500 ms,
c) determining a position of the guide blades (5) of the variable turbine geometry (VTG) for optimum increase in charge pressure at least predominantly on the basis of rotational speed values (n) and torque values (T) of the supercharged internal combustion engine,
d) adjusting the guide blades (5) to the position which is determined in step c), and
e) regulating the charge pressure (P2) by adjusting the position of the guide blades (5) in a closed regulating loop.

2. The regulating method as claimed in claim 1, with the method steps c) and d) being carried out after the method step a) and before the method step e).

3. The regulating method as claimed in claim 2, wherein, after a drop in torque on account of a shift process, the VTG guide blades are placed into a maximum permissible closed position for a certain time period of a maximum of one second.

4. The regulating method as claimed in claim 2, wherein the method steps c) and d) are carried out, with regard to the control of the charge pressure, in an open regulating loop and are carried out, with regard to the regulating of the guide blade position, in a closed regulating loop.

5. A turbocharger for an internal combustion engine comprising:
a compressor;
a turbine connected to the compressor via a rotor shaft, the turbine having a variable turbine geometry VTG with adjustable guide blades; and
a regulating device comprising a first determining device, a second determining device, a charge-pressure regulator and a guide blade position regulator, the regulating device operatively configured to:
close the guide blades of the variable turbine geometry (VTG) as a function of an operating point of the internal combustion engine to an associated maximum closed position of the guide blades for the operating point, wherein the operating point is determined on the basis of rotational speed values (n) and torque values (T) of the supercharged internal combustion engine at which it is sought to increase the exhaust-gas back pressure (P3), and
regulate charge pressure by adjusting the position of the guide blades in a closed regulating loop.

6. The turbocharger as claimed in claim 5, wherein the regulating device is further configured to:
determine a nominal value for the charge pressure from rotational speed and torque data of the internal combustion engine;
determine the position of the guide blades from the rotational speed and torque data of the internal combustion engine; and
regulate the charge pressure on the basis of the input rotational speed and torque values and the nominal value of the charge pressure.

7. The turbocharger as claimed in claim 6, wherein the regulating device is further configured to:
regulate the charge pressure on the basis of fed-back actual charge pressure values.

8. The turbocharger as claimed in claim 5, wherein the regulating device is further configured to:
regulate the position of the guide blades of the variable turbine geometry (VTG) on the basis of the nominal values of the guide blade position.

9. The turbocharger as claimed in claim 8, further including:
sensors for measuring the position of the guide blades, and wherein the regulating device is further configured to:
feed back the sensed actual position of the guide blades, and
regulate the position of the guide blades of the variable turbine geometry (VTG) on the basis of fed-back actual values of the actual measured guide blade position from the sensors.

10. The turbocharger as claimed in claim 5, wherein the regulating device is further configured to:
close the guide blades of the variable turbine geometry (VTG) as a function of the present operating point of the internal combustion engine to an associated maximum possible closed position of the guide blades at plurality of operating points, each of the operating points having an associated maximum possible closed position of the guide blades.

11. A turbocharger (1) for an internal combustion engine (13), in particular a spark-ignition or diesel engine, comprising:
a compressor (2);
a turbine (4) which is connected to the compressor (2) via a rotor shaft (3) and which has a variable turbine geometry VTG with adjustable guide blades (5), and
a regulating device (6) having the following components:
a first determining device (7) configured to determine a nominal value ($P2_{NOMINAL}$) for the charge pressure (P2) from rotational speed and torque data (n, T) of the internal combustion engine (13);
a second determining device (8), which is connected in parallel with the first determining device (7), configured to determine the position of the guide blades (5) of the variable turbine geometry (VTG) for optimum increase in charge pressure at least predominantly on the basis of rotational speed values (n) and torque values (T) of the supercharged internal combustion engine (13);
a regulator (9), which is connected in series with the first determining device (7) and is configured to regulate the charge pressure (P2) on the basis of the input rotational speed and torque values (n, T) and the nominal value ($P2_{NOMINAL}$) of the charge pressure and, optionally, fed-back actual charge pressure values ($P2_{ACTUAL}$); and
a guide blade position regulator (10) which is connected in series with the regulator (9) and configured to close the guide blades (5) of the variable turbine geometry (VTG), as a function of the present operating point of the internal combustion engine (13) which is supercharged by means of the turbocharger (1), to the maximum closed position of the guide blades (5) for this operating point, and regulate the position of the guide blades (5) of the variable turbine geometry (VTG) on the basis of the nominal values ($POS_{VTG\_NOMINAL}$) of the guide blade position supplied by the second determining device (8), the output signals supplied by the regulator (9) and, if appropriate, fed-back actual values ($POS_{VTG\_ACTUAL}$) of the actual guide blade position, to an optimum position of the guide blades (5) which is determined.

12. The turbocharger as claimed in claim 11, further comprising sensors (11, 12) for measuring the actual position of the guide blades ($POS_{VTG\_ACTUAL}$) and the charge pressure ($P2_{ACTUAL}$).

13. The regulating method as claimed in claim 1, wherein the step a) is performed at any one of a plurality of operating points, each of the operating points having an associated maximum possible closed position of the guide blades.

14. The turbocharger as claimed in claim 11, wherein the regulating device is further configured to:
close the guide blades of the variable turbine geometry (VTG) as a function of the present operating point of the internal combustion engine to an associated maximum closed position of the guide blades for the present operating point, and
regulate charge pressure by adjusting the position of the guide blades in a closed regulating loop.

* * * * *

UNITED STATES PATENT AND TRADEMARK OFFICE
CERTIFICATE OF CORRECTION

PATENT NO. : 9,708,984 B2
APPLICATION NO. : 12/519547
DATED : July 18, 2017
INVENTOR(S) : Volker Mueller, Ralf Christmann and Gerd Spinner It is certified that error appears in the above-identified patent and that said Letters Patent is hereby corrected as shown below:

Column 1, the last paragraph should read:
FIG. 1 shows a diagram for explaining the regulating method according to the invention,
FIG. 2 shows a further diagram for explaining advantageous effects of the regulating method according to the invention, Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*